United States Patent [19]
Namon

[11] 3,730,171
[45] May 1, 1973

[54] IMPEDANCE RELATED BLOOD FLOW MEASURING DEVICE

[76] Inventor: Richard Namon, P. O. Box 822, Coral Gables, Fla. 33134

[22] Filed: Sept. 23, 1971

[21] Appl. No.: 183,217

Related U.S. Application Data

[63] Continuation of Ser. No. 818,307, April 22, 1969, abandoned.

[52] U.S. Cl. ................... 128/2.05 Z, 128/2.05 F
[51] Int. Cl. ................................................. A61l 5/00
[58] Field of Search ............... 128/2.05 F, 2.05 R, 128/2.05 U, 2.06 R, 2.08, 2.1 R, 2.1 Z

[56] References Cited

UNITED STATES PATENTS

3,452,743  7/1969  Rieke .................. 128/2.1 Z
3,340,867  9/1967  Kubicek et al. ........... 128/2.1 Z

Primary Examiner—William E. Kamm
Attorney—Hofgren, Wegner, Allen, Stellman & McCord

[57] ABSTRACT

A cardiac blood flow measuring method and apparatus including two current electrodes and two voltage pick-up electrodes positionable in direct contact with the subject, with a circuit for applying a high frequency, low voltage current to the current electrodes and a circuit for measuring the total impedance across the voltage pick-up electrodes by using a summing circuit for adding selectively either a resistive or a reactive voltage to the subject's total impedance voltage to determine selectively either the subject's resistive impedance or reactive impedance with the reactive impedance being employed to measure cardiac blood volume flow.

21 Claims, 13 Drawing Figures

IMPEDANCE RELATED BLOOD FLOW MEASURING DEVICE

RELATED APPLICATION

The present application is a continuation of applicant's application Ser. No. 818,307, filed Apr. 22, 1969, entitled "Impedance Related Blood Measuring Device," now abandoned.

BACKGROUND OF THE PRESENT INVENTION

There have been many attempts in the past to monitor cardiac output using electronic equipment having pick-up sensors either in direct contact with the body surface or spaced from the body. For example, it is known that biological changes may be reflected by measuring the capacitance between two plates. Investigators have employed this technique directly on a heart to follow changes in the heart activity; they have also placed the plates on both sides of the thoracic cavity to follow heart beat and respiration, and also employed a single capacitor plate spaced from the body employing the body surface as the other plate of the capacitor for the purpose of following body surface motion. In these examples, the plates are spaced from the body or tissue but nevertheless the systems associated therewith are sensitive to subject surface motion and for this reason have not proved satisfactory.

It is also known that investigators have attempted to measure body impedance employing a pair of electrodes. Depending upon the size and the material of the electrodes there is a fixed impedance at the contact surface which has a large reactive component and therefore reactive impedance measurement with two electrodes are subject to considerable motion artifact due to electrode contact variations. Moreover, two electrode impedance measuring devices mainly monitor the biological material very near the electrodes themselves.

While four wire impedance monitoring techniques have been employed, these have been used to determine either the total impedance vector or the resistive impedance vector.

For the above reasons the prior known impedance measuring devices have not produced useful biological information because of their lack of accuracy and moreover, are not satisfactory for accurately measuring blood flow.

SUMMARY OF THE PRESENT INVENTION

In accordance with the present invention an impedance monitoring device is employed for measuring blood flow atraumatically by measuring the reactive impedance between electrodes with a four wire electrode arrangement. This system is less affected by electrode size and contact than a two wire system and more importantly it has been demonstrated experimentally that the reactive impedance factors in the body relate better to, i.e. are more linear with respect to, blood flow than either the resistive impedance or the total impedance factors using the same electrode geometry. While as disclosed herein the present device and technique have particular utility in monitoring heart blood flow, it is likely that this device can yield valuable information relating to blood dynamics in other areas of the body.

In clinical tests employing this reactive impedance technique according to the present invention, absolute reactive impedance amplitudes correlated well with cardiac stroke volume in 129 simultaneous determinations in dogs. Similar results have been recently obtained in human investigations. In the dog determinations a standard deviation of approximately 19 percent was found in correlating blood stroke volume with absolute reactive impedance amplitudes. The accuracy of the reactive impedance measurement has been found to hold true over a large range of heart rate and stroke volume.

The basis for the present technique and apparatus design associated therewith has resulted from my investigations through reactive rheometric techniques of the relationship between reactive impedance and heart stroke volume.

These basic investigations were carried out on dogs and the total cardiac output was determined by injecting indocyanine green dye into the right ventricle with blood withdrawn from the left ventricle into a Gilford densitometer for dilution curves. A large cannula was placed in the vena cava inferior via a femoral vein to allow rapid blood volume changes.

Various techniques were employed to alter cardiac stroke volume including rapid hemorrhage, transfusion, catecholamines and miocardioischemia.

Four aluminum foil electrodes with 2.5 by 2.5 cm dimensions, having thin wire leads coated with ECG paste were attached to the acetone-cleaned body surface. To monitor impedance changes in the chest, one current input electrode was placed above the sternal notch (one-third up the neck) and the other below the xyphoid process on the lower abdomen. Two voltage sensing electrodes were placed midline on the sternum at the estimated level of the apex and base of the heart respectively. The skin over the sternum had a minimum of motion transmitted by the heart.

The apparatus employed applied a low, non-stimulating, current of 37kHz (kilohertz) frequency, with a constant peak amplitude of 2 ma rms, with the peak voltage produced by that current on the chest being measured. Since voltage is proportional to impedance times current, the voltage measured is proportional to the resistive and reactive components of body impedance. This voltage represents the sum of the resistive and reactive components which are ninety degrees out of phase. The device employed separates the resistive and reactive components so that it is possible to monitor either the resistive or reactive electrical impedance of the subject.

The voltage electrodes are used to measure total impedance and accordingly the circuit is designed to convert the total impedance change to a resistive or reactive impedance. Rather than separating the measured voltage into components the circuitry adds selectively, depending upon the mode selected by the operator, a resistive or reactive voltage at least ten times greater in amplitude than the total measured impedance voltage. A reading circuit is provided which detects only the peaks of the resulting voltage so that only the component of the measured voltage in phase with the added voltage is measured and in this manner the out of phase voltage is zero and has no influence thereon.

More specifically, the present instrument provides a constant current via the input electrodes which passes, as 37kHz, through the subject and (selectively) a series 100 ohm resistor or capacitor. A transformer, electrically in parallel with the resistor or capacitor depending upon the selected mode, adds the voltage across the input series load with the voltage across the subject pick-up electrodes. These two voltages are added together in vector fashion so that the instrument sees a voltage whose peak value is either mainly resistive or reactive. Therefore, the instrument reflects the resistive or reactive changes across the chest of the subject according to the choice of either a resistor or a capacitor in series in the current input circuit.

This is possible because the subject pick-up voltage is less than ten percent of the voltage across the series load. There is no appreciable voltage loss across the transformer or across the pick-up electrodes using the proper pick-up electrode size and transformer load.

The impedance of this transformer from the voltage pick-up side and across the subject pick-up electrodes is less than five percent of the measuring instrument impedance to maintain the electronic integrity of the device.

The sequence of electrode connections is important since a reversal of either current or voltage pick-up electrodes will reverse the phase between the discriminating voltage and the sensed voltage and thereby reverse the polarity of the measured signal.

As a result of these studies it has been found that the resistive rheogram has a more complex shape than the reactive rheogram, the former having its maximum change shortly after the onset of the systole. The primary differences between the resistive and reactive rheograms became apparent when stroke volume was changed by hemorrhage and transfusion. In one case the relationship between stroke volume and resistive rheometry was poor while the correlation between stroke volume and reactive rheometry was excellent, and this led to further investigations into the reactive relationship. The reactive rheogram decreases between the R and S wave of the electrocardiogram and reaches a minimum during the T wave of the trace or about the time of peak ventricular pressure. It precedes the aortic pulse during systole which suggests that it does not originate in the peripheral pulse. The amplitude of the reactive rheogram reflected quite accurately the induced changes of stroke volume as determined by the green dye dilution technique.

The inline placement of the electrodes discussed above appears to minimize motion artifacts, apparently because of the minimization of respiratory movements and the transmitted pulse so that monitoring reflected deep impedance changes. This does not necessarily imply, however, that the measured impedance changes are confined to the circulating blood volume between the voltage sensing electrodes. This is true because the current and pick-up electrodes may be interchanged without altering the measurement. This apparently demonstrates that volumes common to both pairs of electrodes are monitored with the four lead system.

While the source of reactive impedance pulses over the chest is not clearly known, their synchronism with the start of the ventricular ejection phase strongly suggests that they reflect blood volume changes of the heart and thus may be employed as an indirect method according to the present invention to measure cardiac stroke volume employing electrical impedance methods.

DETAILED DESCRIPTION OF THE PREFERRED EMBODIMENTS

Figure 1A:
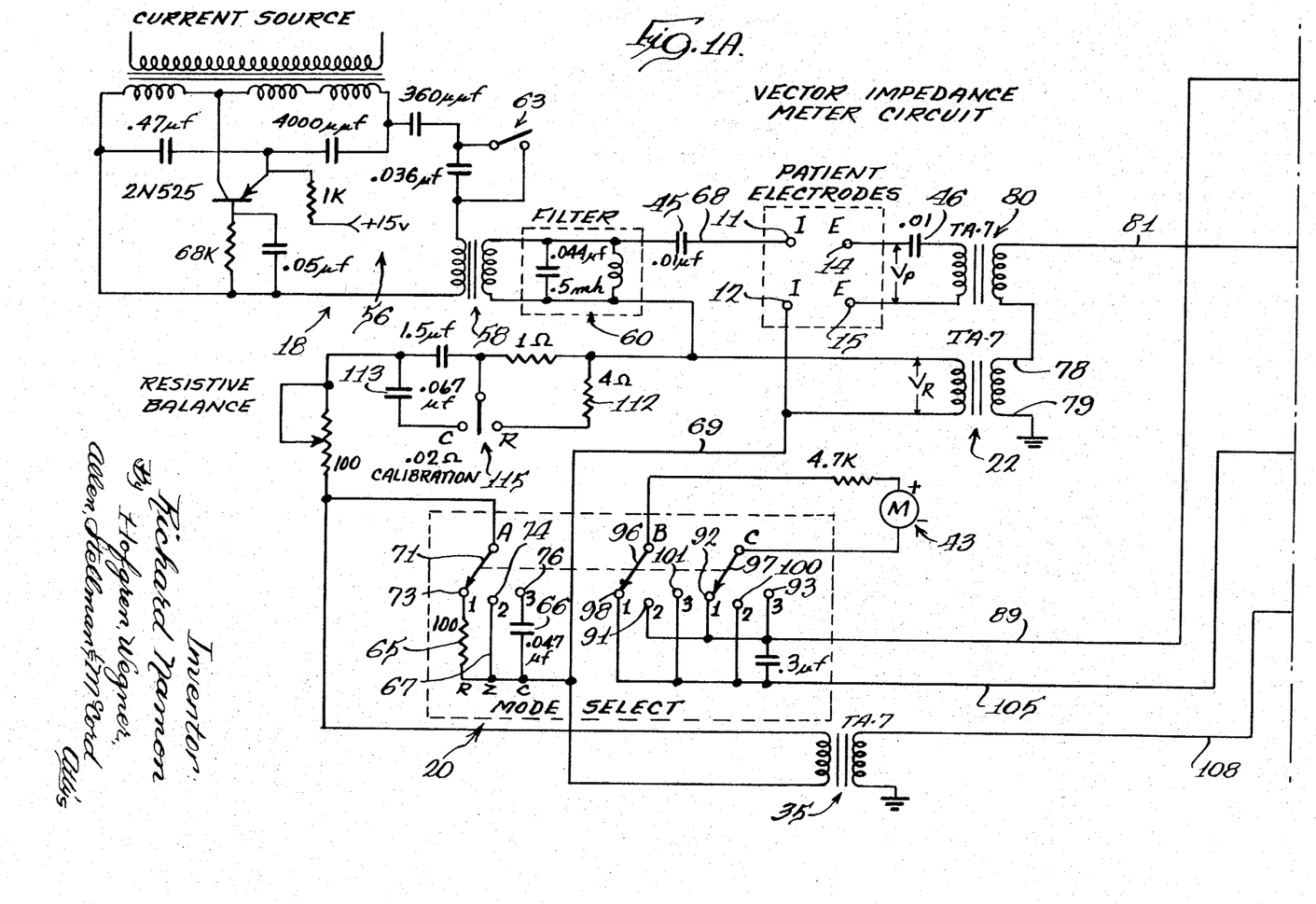
FIGS. 1A and 1B are a continuous schematic illustration of an electronic control circuit embodying the principles of the present invention.
Figure 1B:
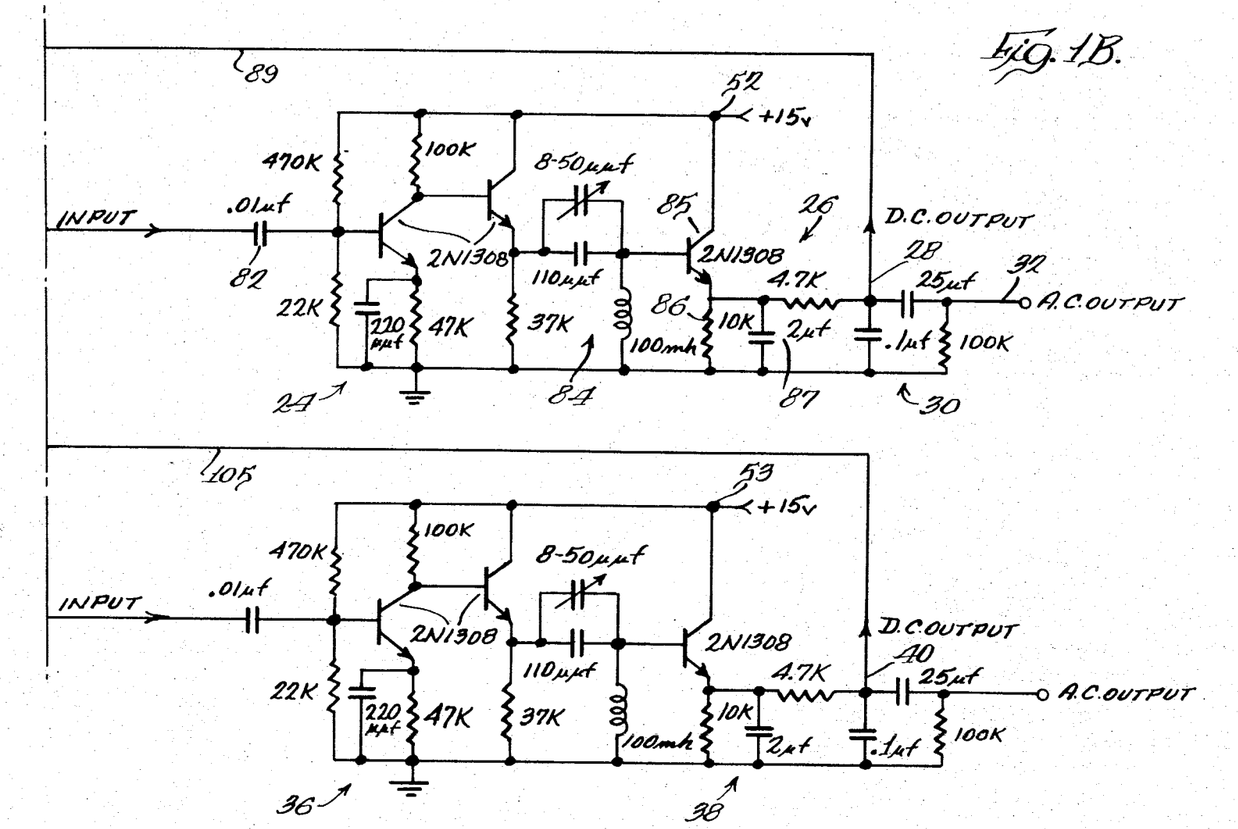

Referring to the circuit shown in FIGS. 1A and 1B current electrodes 11 and 12 are illustrated along with voltage pick-up electrodes 14 and 15. While there are several useful electrode locations for cardiac monitoring according to the present invention, the use of one pair of electrodes placed on the sternum approximately bracketing the heart (typically from the second rib to the lower sternal notch) is preferred. The other pair of electrodes may be placed, respectively, above the sternal notch and below the xyphoid process on the lower abdomen. In the present four wire system (four electrodes) which has a high current source impedance and a low input impedance for the voltage pick-up circuit, the current electrodes 11 and 12 can be interchanged with the voltage electrodes 14 and 15 so that it does not matter which pair of electrodes are placed on the sternum. However, it should be understood that both of the current electrodes or both of the voltage electrodes should be placed on the sternum for cardiac monitoring. Or in more general terms, the two middle electrodes should both be of the same type. This useful electrode position has utility in resistive impedance measurements as well as reactive impedance measurements.

A further preference in electrode positioning is that the voltage electrodes 14 and 15 must be separated from the current electrodes 11 and 12 by at least one heart length. If the current and voltage electrodes are placed closer to each other, then the sensitivity of measurements to body motion becomes too great for useful blood flow measuring.

The circuit shown in the drawing is adapted to operate in a four wire system and includes a mode selection circuit so that the apparatus may be used to measure, selectively, total body impedance, resistive body impedance or reactive body impedance. While the apparatus is capable of making these measurements, it should be understood that the blood volume measuring characteristics and accuracies of the present circuit are attributable to the circuit's capability of measuring reactive impedance even though the circuit can monitor other impedance parameters. Nevertheless, as described above, the circuit configuration and electrode placement does have utility in resistive impedance measurements even though not particularly suitable for measuring blood flow. It should also be understood that if a plurality of circuits shown in FIGS. 1A and 1B are employed that total impedance, reactive impedance and resistive impedance may be simultaneously monitored.

Referring to FIGS. 1A and 1B, a constant current source 18 provides a constant current to the current electrodes 11 and 12. A mode selection circuit 20 selectively places a resistor in series with the body if resistive impedance is to be measured, a capacitor in series with the body if reactive impedance is to be measured, or a short circuit if total impedance is to be measured.

The voltage across the mode selection circuit is employed as a reference voltage and is added to the voltage from the two body voltage pick-up electrodes 14 and 15 by a suitable transformer 22.

The magnitude of the reference voltage for resistive and reactive vector measurements is determined by the impedance of the series component in the mode selection circuit 20. This is chosen to provide a voltage much greater than obtained from the body. In the total impedance mode no voltage is added to the voltage pick-up across electrodes 14 and 15.

The summed voltage is amplified by a transistor amplifier stage 24 shown in FIG. 1B, and filtered and rectified by circuit 26 to provide a representation of the total vector impedance at DC output 28. A capacitor blocking filter network 30 in series with this output blocks the DC voltage and allows only an AC voltage to pass to an AC output 32, reflecting short term impedance pulses. An electronic time constant of 2.5 seconds has been found optimal for reproducing AC impedance pulses following the heart beat.

Figure 2:
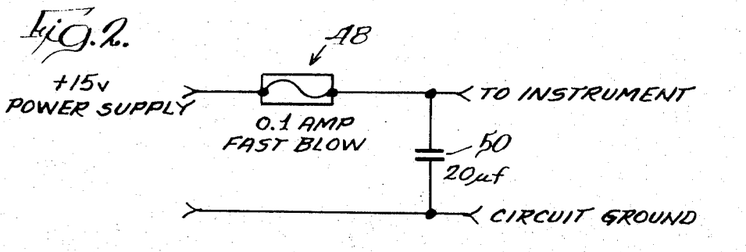
FIG. 2 is a safety circuit for the DC power supply for the circuit shown in FIGS. 1A and 1B.

A compensation channel including transformer 35, amplifier 36, and rectifier 38 provides a compensating signal 40 to cancel out input current variation effects and allow a meter 43 to monitor relative impedance vector magnitudes. The DC outputs 28 and 40 are differentially connected through the mode selection circuit 20 across meter 43. All the patient electrode inputs are coupled through capacitors 45 and 46 which have a 250 kilohm impedance at 60 Hz. This reduces the serious shock hazard which could result from a failure of a part of the DC power supply, allowing AC rather than DC to pass to the amplifiers shown in FIG. 1B which AC may be coupled back to electrodes 14, 15. Moreover, as shown in FIG. 2, a fast blow fuse 48 is provided in series between the power supply (DC) and the amplifiers shown in FIG. 1B, to break the circuit upon power supply failure and resulting large amplitude AC passing through the supply, and a capacitor 50 shunts any AC that might pass to ground. It should be understood that the DC supply is not shown in FIGS. 1A and 1B, but the DC output lines 52 and 53 thereof are connected to the amplifier circuits 24 and 36, respectively.

Supply current is provided from the constant current source 18. A source impedance circuit 56 is provided and selected so that it presents an impedance much greater than the subject's biological impedance. Biological impedance across the input electrodes 11 and 12 is significantly affected by electrode size. For example, impedance across a pair of 2 cm diameter electrodes is typically 400 ohms at 30kHz. The impedance circuit 56 is represented by the resistor 56 in the FIG. 3 schematic of the current supply circuit.

Figure 3:
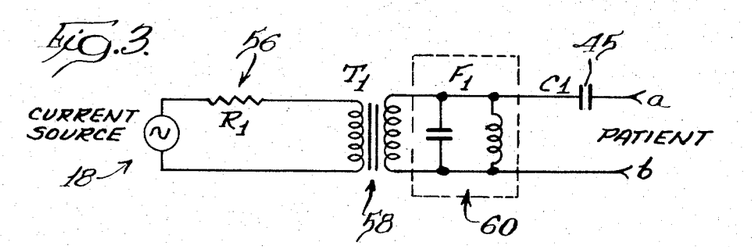
FIG. 3 is a simplified schematic illustration of the constant current source shown in FIG. 1A.
Figure 4:
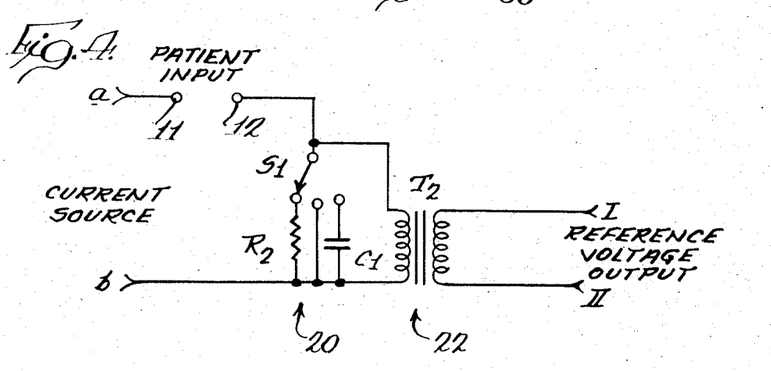
FIG. 4 is a simplified schematic illustration of the reference voltage circuit shown in FIG. 1A.

The current source is isolated from ground by transformer 58 shown in FIGS. 1A and 3. The capacitor 45 serves to prevent shorting out of low frequency biological signals by the circuit connected to electrodes 11 and 12, and is added in series with the patient. Capacitor 45 should have a high impedance at low frequencies.

The current level is set by the size of input electrodes 11 and 12 and is preferably no more than 1 ma (rms) per square cm. The current should have a sinusoidal waveform, so a parallel resonant circuit 60 is provided coupled to the isolation transformer 58. As explained below, a calibration circuit 63 is provided in the current source circuit 18 for the purpose of calibrating input current to the extent of about one percent.

As discussed above, in accordance with the electronic circuit principles of the present invention, a reference voltage is derived by providing a load in series with the body. The load is selected so that it provides a signal having the same phase as the impedance voltage desired to be monitored.

A current is passed through the patient via the current input electrodes 11 and 12 which should have good electrical contact with the body. The mode selection circuit 20 selectively places resistor 65, capacitor 66 or short line 67 in series with current electrode leads 68 and 69 through a mode selection switch 71.

If the operator desires to measure resistive impedance of the subject, switch 71 is positioned to engage contact 73. If total impedance is desired to be measured, switch 71 is placed on contact 74. Short line 67 is merely a bypass. When it is desired that only reactive impedance be measured, the operator places switch 71 on contact 76 which places capacitor 66 in series with the input current leads 68 and 69.

The values of the resistor 65 and the capacitor 66 are chosen according to the anticipated pick-up voltages across electrodes 14 and 15.

Component impedance (the impedance of resistor 65 or capacitor 66) of 100 ohms is satisfactory for human chest monitoring. In this case the effective reactive impedance appears typically as less than a few ohms while resistive impedance may be, for example, approximately or less than 15 ohms. Thus, a reference voltage is provided across lines 78 and 79 associated with isolation transformer 22 determined in magnitude and phase by the impedance selected in the mode selection circuit 20.

The reference voltage across lines 78, 79 is added to the voltage from the patient's chest which allows accurate discrimination between reactive and resistive impedance vectors in the patient. Changes in the total impedance vector are monitored as noted above by placing switch mode selection 71 on contact 74 so that the circuit effects direct following of the patient voltage resulting from the constant current input.

The isolation of the reference voltage $V_r$ by the transformer 22 (FIG. 1A) can introduce frequency distortion and phase shift. The proper selection of a transformer for the frequency of input current holds this phase shift to a maximum of a few degrees.

Figure 5:
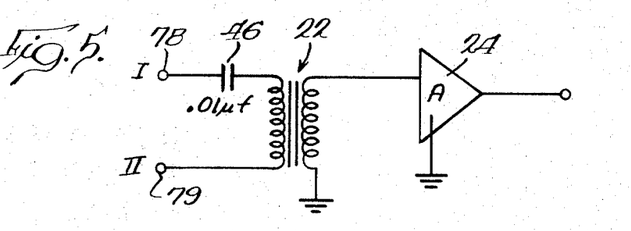
FIG. 5 is a simplified schematic illustration of the voltage adding the circuit shown in FIG. 1A.

Reference voltage $V_r$ is added by the transformer 22 to the patient pick-up voltage $V_p$ designated between electrodes 14 and 15 in FIG. 1A. The patient electrode connections are selected so that the peak voltage of the sum of these two voltages is lower than the peak voltage of the reference voltage $V_r$. Transformer 22 is coupled through transformer 80 to the amplifier 24 and this serves to provide an input signal to the amplifier representing the vectoral addition of the reference voltage $V_r$ and the subject's pick-up voltage $V_p$. In FIG. 5 amplifier 24 is represented schematically. Transformer 80 eliminates the necessity of grounding one of the patient voltage pick-up electrodes and compensates for any phase shift introduced by the reference voltage transformer 22. The capacitor 46, described above, prevents shorting out low frequency signals on the chest and reduces instrument 60 Hz pick-up.

Figure 6:
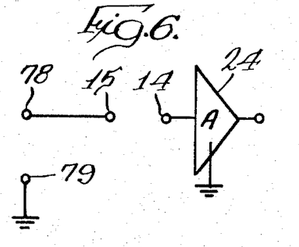
FIGS. 6, 7 and 8 are modified forms of voltage adding circuits.
Figure 7:
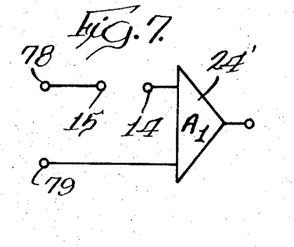
Figure 8:
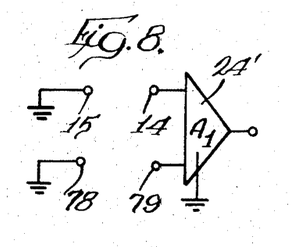

Certain alternatives to the summing circuit described with respect to FIG. 1A and FIG. 5 are shown in FIGS. 6, 7 and 8. The simplest means of adding the voltages is represented by the schematic circuit in FIG. 6 wherein one side of the reference isolation transformer designated 79 is connected to ground and the other side of the transformer output designated 78 is connected to the voltage pick-up electrode 15. This essentially grounds one of the voltage pick-up electrodes and allows a small current to flow through the pick-up electrodes from the reference isolation transformer 22 to the amplifier 24. This effect is minimal if amplifier input impedance is relatively high (e.g. 10 kilohms) and patient impedance across the voltage pick-up electrodes 14 and 15 is reasonably low (e.g. 400 ohms with 2 cm diameter electrodes).

A further alternative for an adding circuit is shown in FIG. 7 wherein grounding of the patient can be eliminated if a differential input amplifier 24' is used instead of the single ended input shown in FIG. 6. To avoid 60 Hz blocking, a ground terminal on the instrument should be available for a patient ground which may be placed on the right leg or somewhere else compatible with the other equipment connected to the patient.

A further embodiment is shown in FIG. 8 for applications requiring the use of small, high impedance pick-up electrodes. This circuit eliminates current drawout through the patient voltage pick-up electrodes due to the grounding of one of the patient voltage pick-up electrodes and by employing a differential amplifier 24'.

Figures 9, 10:
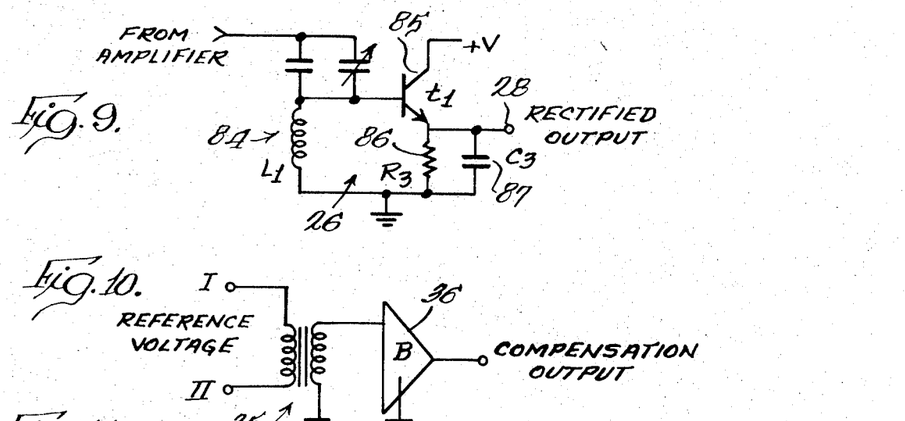
FIG. 9 is a schematic view of one of the rectifiers shown in FIG. 1B.
FIG. 10 is a simplified view of the input current compensation circuit shown in FIGS. 1A and 1B.

Returning to FIGS. 1A and 1B, the resulting summed voltage signal is applied through line 81 and capacitor 82 to amplifier 24 where the summed voltage is amplified nd filtered by a series resonant circuit indicated at 84. The signal is rectified by transistor 85, also shown in FIG. 9, and its ripple is minimized by the proper selection of resistor 86 and capacitor 87. The use of transistor rectification instead of diode reduces circuit noise, i.e. DC input resistance from base to ground is less than 100 ohms, and provides a low impedance source output voltage. The rectified DC output from amplifier and rectifier circuits 24 and 26 is applied through line 89 to contacts 91, 92 and 93 in the mode selection circuit 20. Switches 96 and 97 in the mode selection circuit are coupled mechanically with switch 71. Moreover, the contacts are arranged so that when switch 71 is in its resistive mode position, switch 96 engages contact 98, and switch 97 engages contact 92, when switch 71 is in its total impedance mode position, switch 96 engages contact 91, and switch 97 engages contact 100; when switch 71 is in its reactive mode position engaging contact 76, switch 96 engages contact 101 and switch 97 engages contact 93.

Contacts 98, 101 and 100 are connected to line 105 associated with the output of the current compensator circuit described hereinafter.

Compensation for variations in the current across the reference voltage source is provided since the current source 18 is not a perfect constant current supply. This current compensation is provided by a separate channel consisting of transformer 35, connected across the reference voltage, and amplifier 36 connected to the transformer 35 through line 108. It should be understood that the amplifier 36 along with rectifier 38 are identical with the amplifier 24 and rectifier 26 associated with the summed voltage signal channel. Transformer 35 and amplifier 36 are represented in simplified schematic form in FIG. 10.

Figure 11:
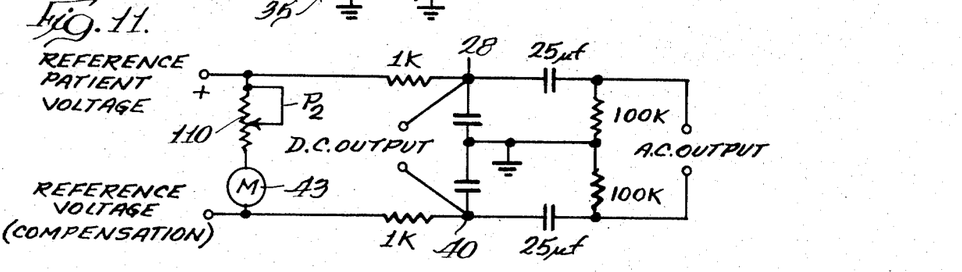
FIG. 11 is a simplified schematic illustration of the amplifiers in FIG. 1B including a meter calibration circuit.

The input into amplifier 36 provides full compensation for reference current variations. It serves to amplify the reference signal with filtering and rectification to provide an output having the same specifications as the DC output at 28. Through the interconnection of the signals in lines 89 and 105 across switches 96 and 97 to meter 43 a differential output is obtained showing only changes originating at the patient voltage pick-up electrodes. The differential voltage between the reference voltage output and the reference voltage plus patient voltage output at the meter represents the impedance vector being monitored. The meter 43 provides a visual indication of this relative vector magnitude. As shown in FIG. 11, which is a simplified illustration of the differential detecting function of the reading circuit in FIGS. 1A and 1B, a variable resistor 110 may be provided in series with the meter for the purpose of calibration.

There is provided in the circuit output suitable filtering and output load protection. The meter 43 allows immediate check of electrode sequence since interchanging either current input or voltage pick-up electrodes reverses output polarity. Calibration current changes through the compensation circuit are cancelled out and only patient current changes are recorded. However, for current compensation that includes the patient the resistance $P_2$ (110) is set so that meter output is zero. Thus, the meter provides the following functions (a) a check of electrode connection sequence, (b) a visual representation of the relative impedance vector magnitude, and (c) a current compensation setting for resistive and reactive measurements.

For calibration purposes, the meter 43 is calibrated with known impedances substituted in place of the patient. Calibration of body impedance changes is accomplished using internal instrument calibration circuitry.

Provision in the current source of circuit 63 (FIG. 1A) permits a current increase of approximately one percent by changing the current source impedance. This gives an effective one percent change in monitored body impedance for all modes (compensation channel required in the resistive and reactive modes). Knowing the monitored impedance from the meter allows conversion of the one percent into ohms.

Figure 12:
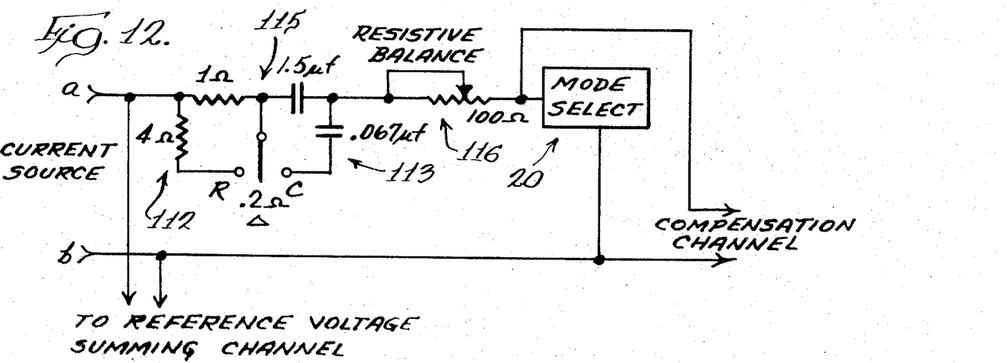
FIG. 12 is a schematic illustration of the mode selection and resistive and reactive calibration circuit shown in FIG. 1A.

Resistive and reactive ohmic calibration of, for example, 0.2 ohms is accomplished by changing small series resistance and reactance 112 and 113 in calibration circuit 115 illustrated in FIGS. 1A and 12. This is done with the reference voltage source in either of the resistive or capacitive modes. A variable resistor 116 is provided for balancing out the resistive impedance component for DC resistive monitoring and for better discrimination in the capacitive mode. This calibration is used with operation of the compensating channel.

I claim:

1. A blood measuring device, comprising: electrode means adapted to be positioned relative to a portion of the subject, and means for measuring the blood flow of the subject including means for measuring the reactive impedance between the electrode means.

2. A blood flow measuring device, comprising: a first pair of input current electrodes, a second pair of pick-up voltage electrodes, both of said pairs of electrodes being positionable relative to the subject, said current electrodes being positioned with respect to said voltage electrodes to provide a current path between the voltage electrodes, means for applying a current to said first pair of electrodes, and means for indicating the blood flow of the subject including means for measuring the reactive impedance across said second pair of electrodes.

3. A method of measuring body impedance, comprising the step of placing one of a pair of current or voltage electrodes on the subject's sternum approximately bracketing the heart, placing the other pair of electrodes each approximately one heart length away from each of said one pair of electrodes, and measuring the reactive impedance between the voltage electrodes.

4. A method of measuring body impedance as defined in claim 3, wherein said one pair of electrodes are placed midline on the sternum and the other pair of electrodes are positioned to flank and be in line with said one pair.

5. A blood flow measuring device as defined in claim 2, wherein said means for measuring reactive impedance includes means for measuring total subject impedance between the second pair of electrodes, means for adding a reference reactive impedance signal to a total reactive impedance signal and providing a total signal, and means for measuring the peaks of said total signal.

6. A blood flow measuring device as defined in claim 5, wherein said means for applying a current to said first pair of electrodes includes a source of low magnitude current of approximately two ma rms having a frequency of approximately 37k Hertz.

7. A blood flow measuring device as defined in claim 5, wherein said reference reactive impedance signal is at least ten times greater in amplitude than the measured total impedance signal.

8. A monitoring apparatus for measuring body impedance, comprising: electrode means adapted to be applied to the subject, means for deriving a voltage signal representing a reference impedance in phase with the impedance desired to be measured, means for measuring the total impedance across said electrode means and deriving a subject total impedance voltage, and means for vectorally adding and measuring said reference voltage and said subject voltage.

9. A monitoring apparatus for measuring body impedance as defined in claim 8, including means for measuring the peak values of the voltage resulting from the addition of the reference voltage to the subject voltage.

10. A monitoring apparatus for measuring body impedance as defined in claim 8, wherein said electrode means includes two voltage pick-up electrodes, two current electrodes for providing a current flow between the voltage electrodes, and a current source connected to said current electrodes, said voltage electrodes being positioned with respect to said current electrodes to sense voltage provided thereby.

11. A monitoring apparatus as defined in claim 10, including means for applying a low magnitude current to said current electrodes, a series connected load to said current electrodes providing said reference voltage.

12. A monitoring apparatus as defined in claim 11, including a mode selection circuit converting the device to measure either resistance or reactive impedance, said mode selection circuit including a resistive load and a reactive load and means for selectively connecting said resistive or reactive load to the current electrodes depending on the desired impedance value to be measured.

13. A monitoring apparatus as defined in claim 8, wherein said means for measuring total impedance includes an amplifier coupled to said electrode means, said reference voltage means being coupled to said amplifier, rectifier means coupled to said amplifier, and visual indicating means coupled to said rectifier means.

14. A body impedance measuring apparatus comprising: electrode means adapted to be applied to the subject, input circuit means for applying a low magnitude alternating current to said electrode means, a mode selection current for measuring either resistive or reactive impedance including a resistive load and a reactive load, selector means for connecting one of said loads in series in said input circuit means, the voltage drop across the desired load representing a reference voltage, subject impedance circuit means for measuring the total impedance across said electrode means and deriving subject impedance voltage, circuit means for vectorally adding said reference voltage and said subject voltage, and means for measuring the voltage produced by the addition of the reference voltage and subject voltage.

15. A body impedance measuring apparatus as defined in claim 14, including means for indicating the peak value of the voltage resulting from the addition of the reference voltage and the subject voltage.

16. A body impedance measuring apparatus as defined in claim 14, wherein said input circuit means has an impedance substantially greater than the subject impedance.

17. A body impedance measuring apparatus as defined in claim 14, including transformer means in said input current means for isolating the current source from ground.

18. A body impedance measuring apparatus as defined in claim 14, including capacitor means in series in said input circuit means to prevent blocking out lower frequency biological signals.

19. A body impedance measuring apparatus as defined in claim 14, including transformer means across said mode selection circuit for isolating the reference voltage.

20. A body impedance measuring apparatus as defined in claim 19, including transformer means across the electrode means employed for subject voltage pick-up for eliminating the necessity of grounding the patient.

21. A body impedance measuring apparatus as defined in claim 14, including an input current compensation circuit including a compensation channel coupled to said reference voltage, and means differentially responsive to said compensation channel output and said adding means.

* * * * *